(12) United States Patent
Tsai et al.

(10) Patent No.: US 8,593,331 B2
(45) Date of Patent: Nov. 26, 2013

(54) RF RANGING-ASSISTED LOCAL MOTION SENSING

(75) Inventors: Ming-Chang Tsai, San Diego, CA (US); Amal Ekbal, San Diego, CA (US); David Jonathan Julian, San Diego, CA (US); Chong U. Lee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 484 days.

(21) Appl. No.: 12/816,945

(22) Filed: Jun. 16, 2010

(65) Prior Publication Data

US 2011/0312279 A1    Dec. 22, 2011

(51) Int. Cl.
*G01S 13/74* (2006.01)
(52) U.S. Cl.
USPC .................. 342/42; 342/27; 342/28; 342/118
(58) Field of Classification Search
USPC ............................................... 342/27–28, 118
See application file for complete search history.

(56) References Cited

U.S. PATENT DOCUMENTS

| 2007/0030348 | A1  | 2/2007  | Snyder |
| 2007/0121097 | A1* | 5/2007  | Boillot ........................... 356/28 |
| 2007/0279237 | A1  | 12/2007 | Julian et al. |
| 2007/0285306 | A1  | 12/2007 | Julian et al. |
| 2008/0079902 | A1* | 4/2008  | Mandelstam-Manor et al. ............................ 351/222 |
| 2008/0136775 | A1* | 6/2008  | Conant ......................... 345/156 |
| 2008/0246651 | A1  | 10/2008 | Schmidt et al. |
| 2008/0262786 | A1* | 10/2008 | Pavlidis ........................ 702/141 |
| 2009/0270170 | A1* | 10/2009 | Patton ............................. 463/36 |
| 2010/0207880 | A1* | 8/2010  | Shaver et al. ................ 345/158 |
| 2010/0302152 | A1* | 12/2010 | Kirigaya ...................... 345/158 |
| 2010/0331041 | A1* | 12/2010 | Liao et al. .................. 455/556.1 |
| 2012/0129606 | A1* | 5/2012  | Rofougaran et al. ........... 463/39 |

OTHER PUBLICATIONS

International Search Report and Written Opinion—PCT/US2011/040762—ISA/EPO—Dec. 5, 2011.

* cited by examiner

*Primary Examiner* — Timothy A Brainard
(74) *Attorney, Agent, or Firm* — Michael Johnson

(57) ABSTRACT

Example methods, apparatuses, and articles of manufacture are disclosed herein that may be utilized to facilitate or otherwise support RF ranging-assisted local motion sensing based, at least in part, on measuring one or more characteristics of a range between communicating devices in one or more established RF links.

30 Claims, 5 Drawing Sheets

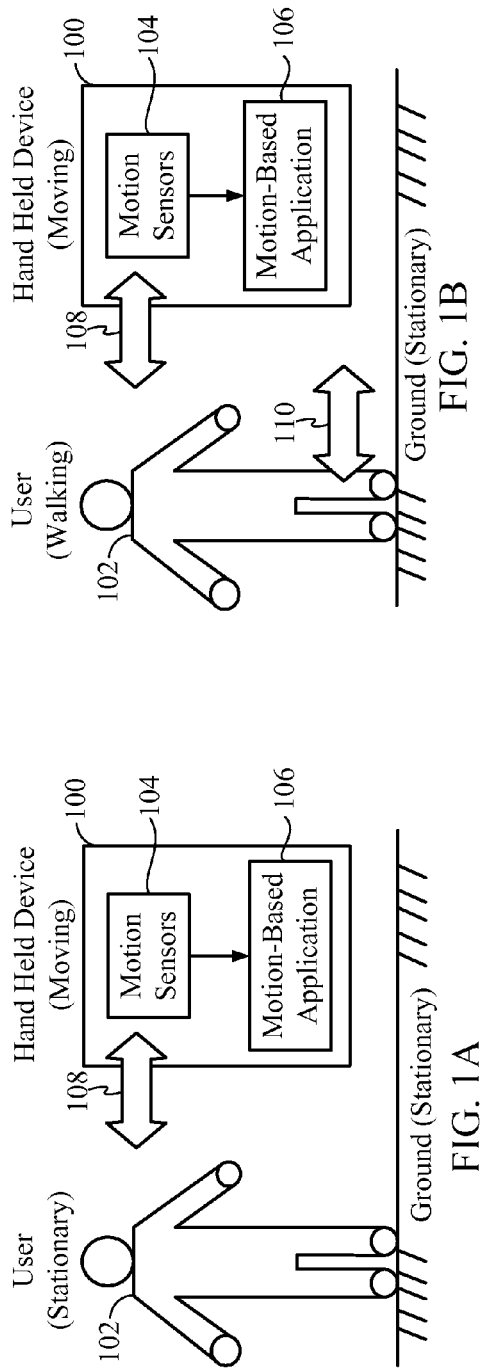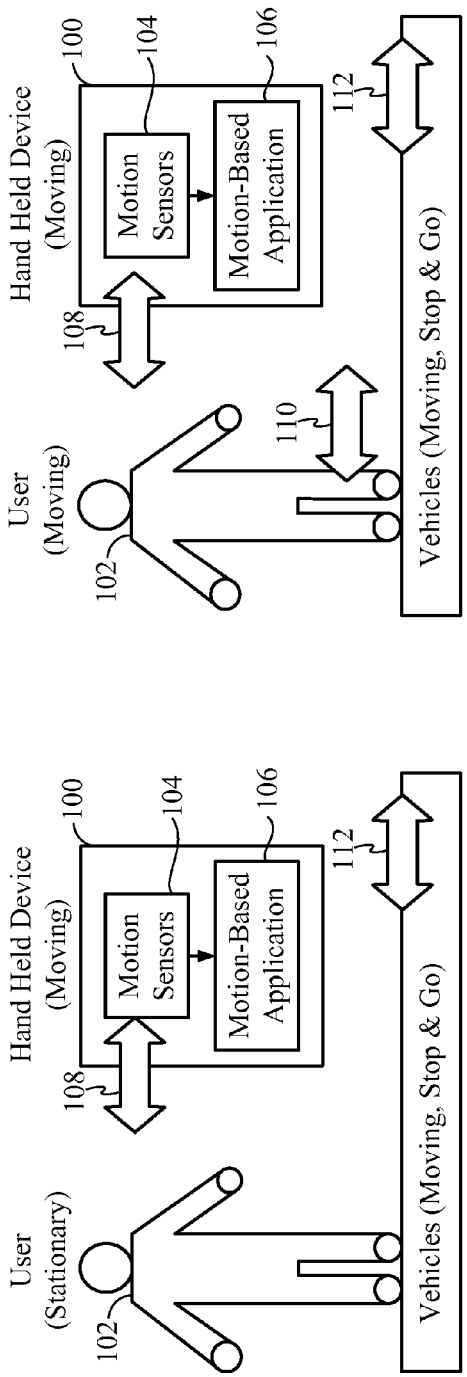

RF RANGING-ASSISTED LOCAL MOTION SENSING

BACKGROUND

1. Field

The present disclosure relates generally to motion sensing in mobile communication devices and, more particularly, to radio frequency (RF) ranging-assisted local motion sensing for use in and/or with mobile communication devices.

2. Information

Mobile or wireless communication devices, such as, for example, cellular telephones, personal digital assistants, electronic book readers, and/or the like have become more common place in daily life. As geographic barriers to personal travel decrease and society becomes more mobile, the need to access information regardless of place and/or time, as well as to stay connected while on the move becomes increasingly important. The use of the Internet, e-mail, electronically-enabled trade or e-commerce, etc., has become widespread, and mobile communication devices may already play a significant role in allowing society to maintain its mobility. Continued advancements in information technology, communications, mobile applications, etc. help to contribute to a rapidly growing market for mobile communication devices, which have become ubiquitous and may already be viewed as "extensions of the hand" altering the manner in which society communicates, does business, and/or creates value.

Mobile communication devices may include a variety of sensors to support a number of applications. Typically, although not necessarily, such sensors may convert physical phenomena into analog and/or digital electrical signals and may be integrated into (e.g., built-in, etc.) or otherwise supported by (e.g., stand-alone, external, etc.) a mobile communication device. For example, these sensors may include inertial or motion sensors (e.g., accelerometers, gyroscopes, compasses, magnetometers, gravitometers, etc.), ambient environment sensors (e.g., ambient light detectors, proximity sensors, vibrational sensors, thermometers, cameras, etc.), or other sensors capable of measuring various states of a mobile communication device. The above sensors, as well as other possible sensors, may be utilized individually or may be used in combination with other sensors, depending on a particular application.

A popular and rapidly growing market trend in sensor-based mobile communications technology includes applications that may recognize one or more aspects of a motion of a mobile communication device and use such aspects as a form of input (e.g., task-oriented or informative hand gestures, wrist-based tilt gestures, etc.), for example, in motion-based or motion-controlled games, web page navigation, image browsing, etc. Typically, although not necessarily, these popular motion-based applications utilize one or more built-in inertial or motion sensors (e.g., accelerometers, magnetometers, etc.), that may, for example, sense and/or measure the direction of gravity, spatial orientation, linear and/or angular motion, and/or other force or field experienced by a mobile communication device. These sensors, however, utilize the Earth's gravitational and/or magnetic fields as an external or global reference frame and, as such, detect and/or measure a motion of a mobile communication device that is global, such as, for example, a motion of the device relative to the Earth-centered coordinates. On the contrary, mobile-based applications typically, although not necessarily, are adapted to act upon a motion that is user-centric or local with respect to a particular user (e.g., local reference frame, etc.), for example, in an attempt to avoid or reduce false positives and/or negatives in detecting user inputs. Such a local motion may include, for example, a movement of the user's hand (e.g., holding a mobile communication device) relative to the user's body or a part of the user's body (e.g., shoulders, head, knees, etc.) representing one or more local references.

Typically, although not necessarily, motion sensors may be able to differentiate between a global and a local motion of a mobile communication device, for example, while a user remains stationary or substantially stationary with respect to the ground (e.g., an external reference frame), such as while a user is standing, sitting, etc. without a change in the user location, position, orientation, etc. However, if a user is operating a mobile communication device, for example, while walking, running, driving an accelerating and/or decelerating vehicle, or being on board of an unsteady (e.g., moving, rocking, etc.) ship, train, etc., motion sensors may not be able to sufficiently differentiate between a global motion and a local motion of the device. For example, in certain situations, a global motion may comprise a combined motion incorporating multiple levels and/or types of motions, such as a motion of a user operating a mobile communication device (e.g., via an input gesture, etc.), a motion of a user's concurrent (e.g., with operating a mobile device) walking or running, a motion of an accelerating and/or decelerating vehicle with a user on-board, etc. Accordingly, continued integration of various acceleration and/or deceleration vectors associated with such multiple motions may lead to drifts (e.g., bias in detections of a mobile device being in motion and being relatively still), thus, potentially "confusing" or otherwise negatively impacting an operation of a motion-based application hosted on the mobile device. Built-in digital cameras may partially help to compensate for such vector displacements and/or lack of a stable local reference frame, but may remain unaware of important aspects of user-device interactions in many different and changing mobile environments due to, for example, light levels, proximity of other people or objects, unwanted target acquisitions, and/or the like. Also, utilizing background sensing, frame stabilizing (e.g., by analyzing optical flow, periphery of the image acquisition area, etc.), and/or like techniques, for example, to detect and/or measure foreground (e.g., local) motion or activity may not provide a sufficiently complete or feasible solution in mobile settings or environments. Accordingly, it may be desirable to develop one or more methods, systems, and/or apparatuses that may implement effective and/or efficient local motion sensing regardless of whether a user remains stationary, walking, being on board of accelerating and/or decelerating vehicles, etc. for more satisfying user experience.

BRIEF DESCRIPTION OF THE DRAWINGS

Non-limiting and non-exhaustive aspects are described with reference to the following figures, wherein like reference numerals refer to like parts throughout the various figures unless otherwise specified.

FIGS. 1A-1D are schematic diagrams illustrating an implementation of a mobile device sensing or detecting one or more aspects of a global motion that may be associated with mobile settings or environments.

SUMMARY

Figure 2A:
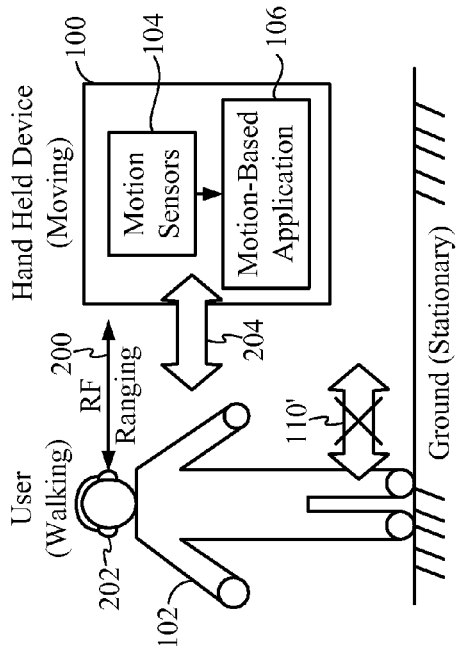
FIGS. 2A-2C are schematic diagrams illustrating example techniques to differentiate between a local motion and various other motions that may be associated with mobile settings or environments.

Example implementations relating to RF ranging-assisted local motion sensing based, at least in part, on measuring one or more characteristics of a range between communicating devices in one or more established RF links are disclosed. In one implementation, a method may comprise measuring one or more characteristics of a range between a mobile device and a second device co-located with a portion of a user's body based, at least in part, on one or more radio frequency (RF) links between the mobile device and the second device; and affecting one or more applications hosted on the mobile device based, at least in part, on one or more measured characteristics of the range. It should be understood, however, that this is merely a particular example of methods disclosed and discussed throughout, and that claimed subject matter is not limited to this particular example.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, and articles of manufacture are disclosed herein that may be used for assisted local motion sensing that may be implemented in and/or with mobile communication devices having a radio frequency (RF) ranging capability. As used herein, "mobile device," "mobile communication device," "wireless device," "handheld device," "reference node," and/or the plural form of such terms may be used interchangeably and may refer to any kind of special purpose computing platform and/or device that may communicate through wireless transmission and/or receipt of information over suitable communication networks according to one or more communication protocols and that may from time to time have a position or location that changes. As a way of illustration, special purpose mobile communication devices, which may herein be called simply mobile devices, may include, for example, cellular telephones, satellite telephones, smart telephones, wireless earphones, wireless headphones, wireless headsets, personal digital assistants (PDAs), laptop computers, personal entertainment systems, e-book readers, tablet personal computers (PC), personal audio and/or video devices, point-of-sale devices, personal navigation units, transceiver chips, and/or the like. It should be appreciated, however, that these are merely illustrative examples relating to mobile or wireless devices that may be utilized for RF-assisted local motion sensing, and that claimed subject matter is not limited in this regard.

As previously mentioned, the above devices, as well as other possible devices not listed, may utilize an RF-based communication technology featuring, for example, an RF ranging capability. As used in the context of the present disclosure, an RF ranging capability may refer to any type of RF-based ranging technology capable of determining a distance or range and/or changes therein between a mobile device and one or more wireless devices serving as reference nodes, based, at least in part, on one or more RF links established between the mobile device and such one or more reference nodes. As will be described in greater detail below, based, at least in part, on such established RF links, one or more characteristics of a range (e.g., measured range, changes in a range, range acceleration and/or deceleration, etc.) with respect to communicating devices may be obtained and utilized for detecting a motion of a mobile device relative to a user. As the term used herein, a "motion" or "movement" may refer to a physical displacement of an object (e.g., a mobile device, etc.) relative to one or more points of reference, for example.

The utilization of motion sensors that detect and/or measure one or more aspects of a global motion of a mobile device may present a number of challenges to users of these devices, however, as previously mentioned. Such challenges may include, for example, a potential "confusion" of a motion-based application being unable to recognize—and, thus, act upon—a certain input gesture of a user (e.g., a local motion) due to a "noise" or "clutter" associated with multiple levels and/or types of motions that may be incorporated into a global motion of a mobile device, as was indicated. As used in the context of the present disclosure, "local" or "user-centric" motion and/or the plural form of such terms may be used interchangeably and may refer to a movement or motion caused by a user moving a mobile device, for example, via an input gesture (e.g., cognitive, contextual, etc.) of the hand, arm, wrist, etc. relative to one or more local references, such as a part or portion of the user's body (e.g., a head, shoulder, knee, eyes, etc.), and/or other local references. On the contrary, a global motion may refer to a movement of an object (e.g., a mobile device, etc.) relative to a global or external reference frame (e.g., the Earth-centered coordinates, etc.). In some situations, such a global motion may comprise, for example, a combined motion integrating various-intensity acceleration and/or deceleration vectors that may ordinarily exist in mobile settings or environments, as will be described in greater detail below with reference to FIGS. 1A-1D. For example, such vectors may be associated with a motion of a user moving or operating a mobile device (e.g., via an input gesture, etc.) while walking, running, being on board of an accelerating and/or decelerating vehicle, rocking or moving ship, train, and/or the like. Thus, in these situations, motion sensors may not be able to differentiate between an input motion of a user relative to a local reference frame (e.g., a local motion) and, for example, an input concurrently received from a detection of various other motions (e.g., due to walking, running, etc.) relative to a global reference frame (e.g., the Earth-centered coordinates, magnetic field, etc.) with respect to changes in a location, velocity, orientation, etc. of a mobile device.

As will be described in greater detail below, to isolate a local motion from various motions that may comprise a global motion of a mobile device, one or more separate or additional measurements not inherent to inertial motion sensors (e.g., accelerometers, magnetometers, etc.), ambient environment sensors (e.g., ambient light detectors, etc.), and/or like sensors that reference an external or global reference frame may be introduced. For example, in one particular implementation, measurements derived from one or more short-range RF links established between wireless devices communicating within a line of sight (LOS) may help to sufficiently isolate a local motion in an effective and/or efficient manner.

More specifically, with the assistance of one or more RF-enabled wireless devices (e.g., wireless earphones, headphones, etc.) serving as reference nodes, for example, co-located with a portion of a user's body (e.g., local references), a mobile device may obtain sufficiently accurate range-related characteristics (e.g., measured range, changes in a range, etc.) and may use such characteristics, in whole or in part, for spatial tracking of the device. For example, such characteristics may be utilized as a primary form of input affecting one or more applications hosted on a mobile device to provide motion-controlled solutions (e.g., for gaming, web page browsing, etc.), whereas input concurrently received from inertial, ambient environment, and/or like motion sensors may be partially or substantially ignored or otherwise minimized. Accordingly, a potential "confusion" of a motion-based application may be avoided or otherwise reduced so as to facilitate or support its sufficient operation regardless of whether a user remains stationary, walking, being on board of accelerating and/or decelerating vehicles, etc. Of course, this is merely an example of isolating a local or user-centric motion from a global motion, and the scope of claimed subject matter is not limited to this specific example.

As will be seen, in one particular implementation, a mobile device may include one or more RF sensors capable of determining a range between the mobile device and a local reference node realized, for example, as RF-enabled wireless earphones co-located with the user's head. Here, an RF sensor may include, for example, a transmitter capable of transmitting and/or a receiver capable of receiving RF energy, a local clock to reference a propagation time of the RF energy, and a processor enabled to determine one or more characteristics of a range between the mobile device and the earphones, just to illustrate one possible implementation. For purposes of explanation, RF sensors may comprise any type of sensors (e.g., RFID detectors, ranging sensors, etc.) that may facilitate or support radio frequency and/or amplitude modulations that may be processed in some manner to measure characteristics of a range between communicating devices based, at least in part, on one or more RF links. Such measurements may be obtained using one or more known RF signal processing techniques (e.g., measuring round-trip delays, changes in received carrier phase and/or power, etc.). As will be seen, these measurements may be converted into special purpose commands or instructions to be interpreted in some manner by one or more applications (e.g., motion-based, etc.) hosted on a mobile device, though claimed subject matter is not so limited. Certain functional features of a mobile or wireless device featuring an RF ranging capability will be described in greater detail below with reference to FIG. 5.

In an implementation, a mobile device may be capable of concurrently receiving signals from multiple RF links, for example, to enhance or improve the accuracy of a local motion sensing. For example, RF sensors associated with a mobile device may receive signals from a first RF link and a second RF link as part of concurrent communication with wireless earphones (e.g., co-located with the user's head) and an RF-enabled laptop computer (e.g., located in sufficiently close proximity to the mobile device), respectively. As will be described in greater detail below, in this example, wireless earphones may serve as a dedicated local reference node and a laptop computer may serve as an opportunistic local reference node, though claimed subject matter is not so limited. As will also be seen, having multiple RF links may help to detect transitions between a mobile device being in motion and being relatively still in a faster and/or more accurate fashion. It should be understood, however, that such dedicated and opportunistic references are merely examples of different types of local references that may be utilized in particular implementations, and claimed subject matter is not limited in this respect.

In one particular implementation, characteristics of a range obtained from one or more RF links may be utilized to affect, for example, a motion-controlled or motion-based application hosted on a mobile device in connection with a user browsing visual content, such as digital maps, images, etc. on a user display. As will be seen, characteristics of a range between a mobile device and, for example, wireless earphones co-located with the user's head may be converted into commands instructing a motion-based application to zoom and/or pan visual content in response to local motions of a user operating the mobile device (e.g., input gestures, etc.).

In certain example implementations, a mobile device may be capable of establishing more than one RF link with a particular local reference node, for example, using a number of RF sensors. Multiple RF links may enable obtaining multiple measurements with respect to one or more characteristics of a range, thus, reducing a potential incidence of a position drift of a mobile device. In addition, measurements obtained from separate RF links may be utilized, for example, to enable or facilitate separate functionalities of a motion-based application hosted on a mobile device, though claimed subject matter is not so limited.

Before describing some example methods, apparatuses, and articles of manufacture in greater detail, the sections below will first introduce certain contexts and/or aspects associated with mobile settings or environments in which RF ranging-assisted local motion sensing may be implemented. It should be appreciated, however, that techniques provided herein and claimed subject matter is not limited to these contexts and/or example implementations. For example, techniques provided herein may be adapted for use in a variety of information processing environments, such as spatial and/or temporal localization applications, location-aware and/or tracking applications, social networking applications, etc. Although specific implementations of RF-based ranging technology are discussed herein, it should be appreciated that a vast array of devices and/or technologies (e.g., infrared (IR), laser, sound ranging, etc.) may be employed with a similar effect. In addition, any implementations and/or configurations described herein as "example" are described for purposes of illustrations and are not to be construed as preferred or desired over other implementations and/or configurations.

FIGS. 1A-1D are schematic diagrams illustrating a mobile device 100 sensing or detecting one or more aspects of a global motion that may be associated with mobile settings or environments, as previously mentioned. For example, a user 102 may operate mobile device 100 via an input gesture (e.g., play motion-controlled games, browse web pages, images, etc.) while remaining stationary or substantially stationary with respect to the ground or the Earth-centered coordinates (e.g., an external or global reference frame), as illustrated in FIG. 1A. One or more integrated motion sensors 104 (e.g., accelerometers, gyroscopes, etc.) may sense or detect a motion of mobile device 100, for example, from a movement of a center of mass of the mobile device referencing the Earth's gravitational field (e.g., a global reference frame), just to illustrate one possible implementation. Inertial measurements from motion sensors 104 may be processed by and/or at mobile device 100 in some manner and may be utilized to affect or instruct a motion-based application 106 hosted on mobile device 100, for example, to perform a particular action, motion-controlled or otherwise. Here, because a user remains stationary or substantially stationary with respect to the ground (e.g., standing) while operating mobile device 100, as indicated generally by a double-sided arrow at 108, user inputs (e.g., user moving the mobile device) may be the only motions present and/or detected by motion sensors 104. Accordingly, because only one type of a motion is present (e.g., user inputs), motion sensors 104 need not to differentiate between a global and a local motion of mobile device 100 in the context of FIG. 1A. Thus, motion 108 of mobile device 100 may be substantially representative of a user-centric motion and, as such, motion-based application 106 is less likely to be "confused" by various acceleration and/or deceleration vectors, as previously mentioned. It should be appreciated, however, that intrinsic acceleration (not shown) produced by unsteady hand and/or wrist (e.g., tremor, shake, etc.) may also be present during operation of mobile device 100 and, as such, may nevertheless cause vector displacements, thus, negatively impacting an operation of application 106. Of course, this is merely an example and is not intended to limit claimed subject matter. Other sources of accelerations may include various spatial inclinations associated with outside weather, such as, for example, heavy rain (e.g., drops, etc.), wind gusts, etc.

Turning now to FIG. 1B, in an implementation, user 102 may operate (e.g., via an input gesture, etc.) mobile device 100 while concurrently walking, running, etc., for example, on a stationary or substantially stationary surface or platform, such as the ground, floor of a house, parked train, etc. As seen in this particular example, motion sensors 104 may detect a global motion of mobile device 100 (e.g., referencing the Earth-centered coordinates) that may comprise, for example, a combined motion incorporating motion 108 caused by user 102 operating mobile device 100 and a motion caused by the user's concurrent walking (e.g., a background motion, "noise," etc.), indicated generally at 110. Because of continued integration of various acceleration and/or deceleration vectors associated with such a combined motion, motion sensors 104 may not be able to differentiate, for example, between motion 108 (e.g., user-centric, etc.) and motion 110 (e.g., background motion or "noise"), as previously mentioned. In addition, under some circumstances, a background motion, such as motion 110, for example, may be erroneously interpreted by motion sensors 104 as a motion of a user operating mobile device 100 (e.g., being processed first, having lower event-triggered thresholds, etc.), thus, shielding or otherwise preventing the detection of user-centric motion 108. Accordingly, this may introduce a potential "confusion" to motion-based application 106, thus, negatively impacting its operation, as discussed above. Of course, it is understood that a global motion of FIG. 1B may incorporate various other motions not shown (e.g., hand tremor, shake, etc.).

Continuing now with FIGS. 1C-1D, which respectively illustrate user 102 being stationary or substantially stationary (e.g., standing) and walking on board of an accelerating and/or decelerating vehicle, train, etc., while operating mobile device 100, by way of example. As seen, a global motion of FIG. 1C may comprise a combined motion incorporating, for example, motion 108 caused by user 102 operating mobile device 100 and a motion caused by an accelerating and/or decelerating vehicle, as schematically shown at 112. These motions, as well as other motions not shown (e.g., hand tremor, shake, etc.) may produce various combinational vectors contributing to an error(s) in interpretation of measurements with respect to various motion states of mobile device 100, as previously mentioned. More specifically, combinational vector(s) of FIG. 1C may prevent sensors 104 from detecting and/or isolating user inputs (e.g., local or user-centric motion 108) from inputs associated with other motions detected in such a mobile environment (e.g., motion 112, etc.). As a result, motion-based application 106 may be less than effective in responding to input gestures of user 102. It should be noted that various other motions may be sensed or detected by sensors 104, for example, due to various vibrations associated with a moving vehicle, train, etc., as well as operation of certain systems within such a vehicle, train, etc. (e.g., engine vibrations, heater or air conditioner vibrations, unevenness in a road or tracks, etc.). Of course, claimed subject matter is not limited to motions described, since other possible motions may be also incorporated into a global motion of FIG. 1C.

FIG. 1D schematically illustrates user 102 walking on board of a moving vehicle, train, etc., while operating mobile device 100 (e.g., via an input gesture, etc.), as mentioned above. Here, motion sensors 104 may sense or detect a global motion that may incorporate, for example, motion 108 of a user operating mobile device 100, motion 110 caused by the user's concurrent walking on board of an accelerating and/or decelerating vehicle, train, etc., and vehicular motion 112. Likewise, because of continued integration of multiple motions leading to various vector displacements, motion sensors 104 may have difficulties isolating user-centric motion 108 from various background motions or "noise," such as, for example, motions 110 and/or 112. As a result, motion sensors 104 may not be able to detect and/or measure a local or user-centric motion (e.g., motion 108) reliably. Accordingly, under some circumstances, a global motion of FIG. 1D may partially or substantially impair the quality of operation or performance of motion-based application 106, as previously discussed. Of course, such details regarding various integrated motions of FIG. 1D are merely examples, and claimed subject matter is not so limited.

Figure 2B:
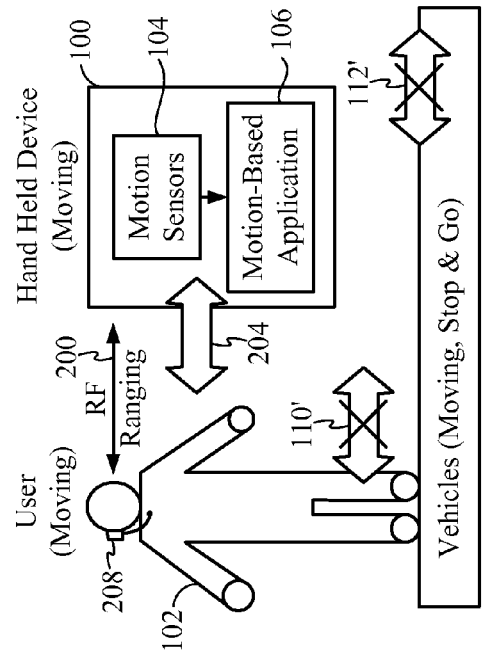
Figure 2C:
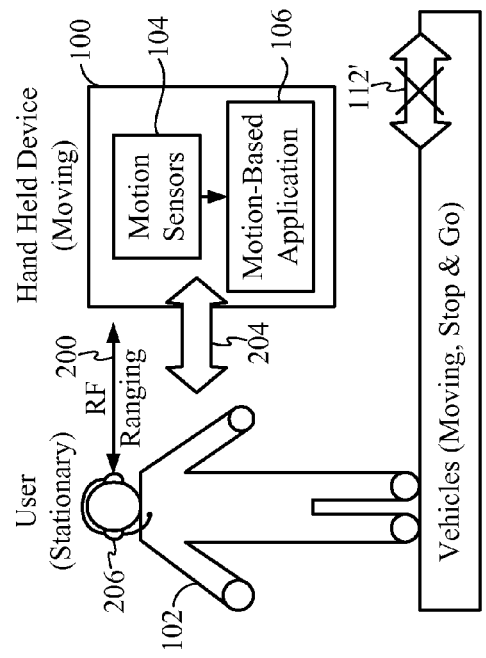

With this in mind, example techniques are described herein that may be used with mobile devices to differentiate between a local or user-centric motion and various other motions that may be associated with mobile settings or environments. As illustrated in example implementations of the present disclosure, such techniques may, for example, allow for a partial or substantial removal of a potential "confusion" of motion-based applications due to a background and/or environmental "noise." For example, as shown in FIGS. 2A-2C, one or more separate or additional measurements not inherent to inertial motion sensing may be introduced that may help to detect and/or isolate a local or user-centric motion of mobile device 100 regardless of whether user 102 remains stationary, walking, being on board of accelerating and/or decelerating vehicles, etc. To simplify discussion, features of mobile device 100 and/or various motions shown in FIGS. 1A-1D that correspond to like features and/or motions of the examples illustrated in FIGS. 2A-2C are given the same reference numbers and/or the numbers with the addition of a prime (').

As seen in FIG. 2A, utilizing RF-based ranging technology (e.g., RF sensors, etc.), one or more RF links, such as an RF link 200, may be established between mobile device 100 and a local reference node realized, for example, as a pair of wireless headphones 202 co-located with the user's head, just to illustrate one possible implementation. Here, wireless headphones 202 may serve as a dedicated reference node, for example, to facilitate or support a spatial tracking of mobile device 100 relative to user 102, though claimed subject matter is not so limited. Particular features of various communicating devices serving as dedicated and/or opportunistic reference nodes will be described in greater detail below with reference to FIG. 3. Based, at least in part, on established RF link 200, mobile device 100 may obtain range-related characteristics and may use such characteristics to detect an input gesture(s) of user 102 representative of a local or user-centric motion, indicated generally at 204. More specifically, range-related characteristics obtained from RF link 200 may be utilized, for example, as a primary form of input affecting motion-based application 106, wherein input detected by motion sensors 104 may be partially or substantially ignored as "noise," as schematically illustrated by a crossed arrow at 110'. Accordingly, motion 204 relative to user 102 (e.g., local or user-centric motion) may be sufficiently isolated and a potential "confusion" of motion-based application 106 may be eliminated or otherwise reduced. As will be seen, range-related characteristics obtained from RF link 200 may be processed in some manner at mobile device 100 to affect motion-based application 106. For example, obtained characteristics may be converted into computer-readable instructions to be programmatically executed through any suitable sequence of operations instructing, for example, application 106 to provide motion-controlled solutions for gaming, web page browsing, digital map navigation, etc. Of course, such a description of RF ranging-assisted local motion sensing and its benefits is merely an example, and claimed subject matter is not limited in this regard.

Continuing now with FIG. 2B, in another implementation, user-centric motion 204 may be sufficiently isolated, for example, from a "noise" associated with a motion of an accelerating and/or decelerating vehicle, train, etc., as schematically shown by a crossed arrow at 112'. In this particular example, mobile device 100 and wireless earphones 206 co-located with the user's head may be connected in a wireless RF link, such as RF link 200, with earphones 200 serving as a dedicated local reference node. Likewise, here, characteristics of a range between mobile device 100 and wireless earphones 206 may be obtained from link 200 to detect and/or isolate motion 204 (e.g., local or user-centric), thus, allowing input detected by motion sensors 104 (e.g., of vehicular motion 112', etc.) to be partially or substantially ignored. It should be appreciated that various other incorporated motions (e.g., hand tremor, engine vibrations, etc.) may be also partially or substantially ignored, as was indicated. Of course, such a technique of isolating a user-centric motion from a vehicular motion and/or other possible motions is merely an example, and claimed subject matter is not limited in this regard.

Similarly, in an example of FIG. 2C, an established RF link, such as link 200, may be employed to detect a local or user-centric motion schematically represented herein by motion 204. Here, a global motion of mobile device 100 may incorporate, for example, motions 110', 112', 204, and/or various other motions that may be sensed or detected by motion sensors 104 (e.g., muscle tremor, engine vibrations, unevenness in a road or tracks, etc.), as previously mentioned. Likewise, utilizing RF ranging capability of mobile device 100 and/or a local reference node represented herein by a wireless headset 208, user-centric motion 204 may be detected and/or isolated, and a potential "confusion" of motion-based application 106, for example, due to a "noise" associated with motions 110' and 112' may be avoided or otherwise reduced. Of course, claimed subject matter is not limited in scope to employing this particular technique or to the approach employed by an RF-based ranging technology. Rather, this is merely provided as an example of an implementation featuring an RF ranging capability of communicating devices. However, many other approaches to providing ranging capability are available (e.g., infrared, laser, sound ranging, etc.), and claimed subject matter is not limited in scope to any particular approach.

Figure 3:
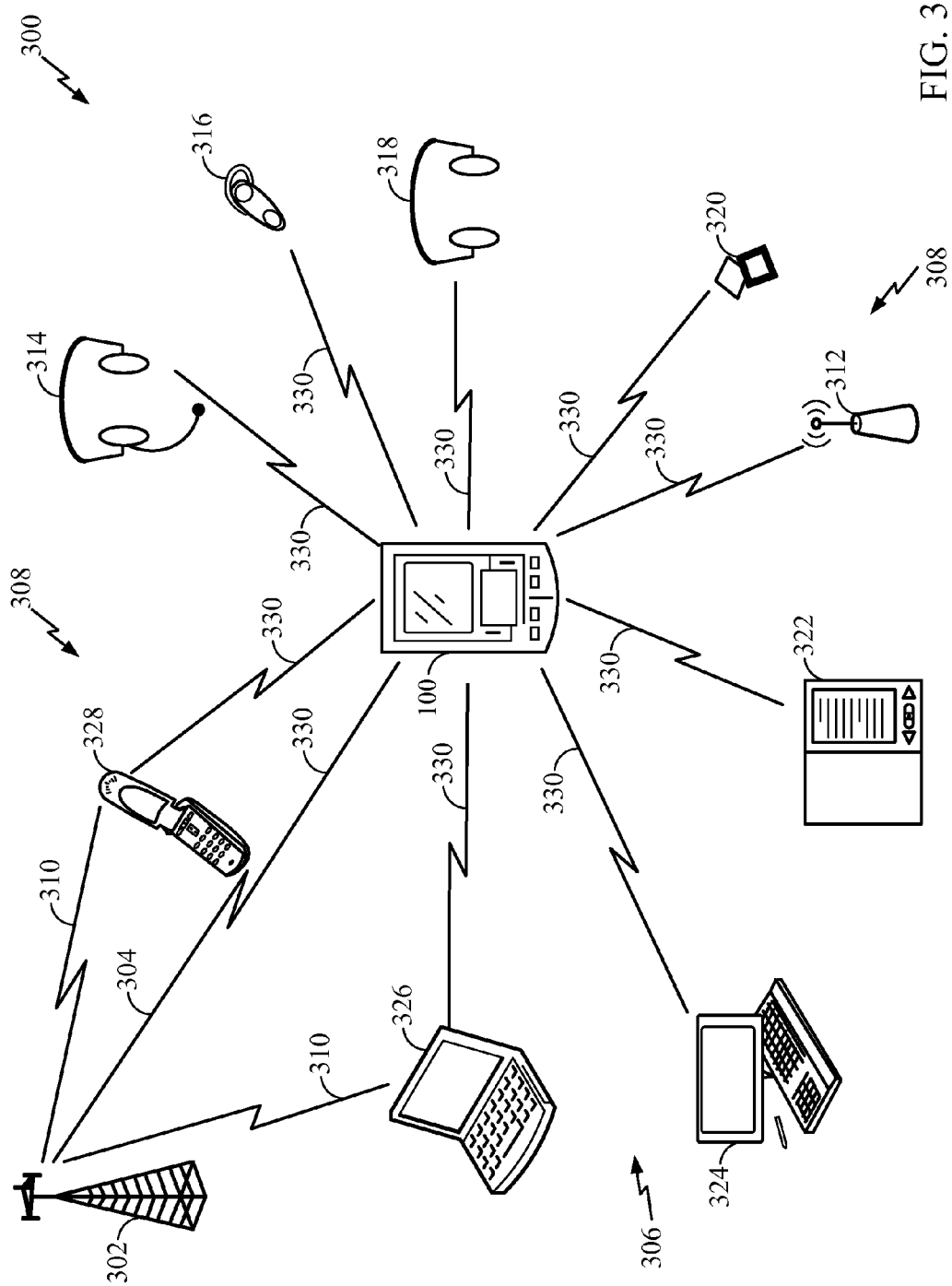
FIG. 3 is a schematic diagram illustrating an implementation of an example signaling environment.

With this in mind, attention is now drawn to FIG. 3, which is a schematic diagram illustrating certain features, functional or otherwise, associated with an example signaling environment 300. Signaling environment 300 may be enabled to facilitate or support RF ranging-assisted local motion sensing based, at least in part, on measuring one or more characteristics of a range between communicating devices in one or more connected or established RF links. It should be appreciated that signaling environment 300 is described herein as a non-limiting example, and that RF ranging-assisted local motion sensing may be implemented, partially or substantially, in the context of various communication networks or combination of networks. Such networks may include, for example, public networks (e.g., the Internet, the World Wide Web), private networks (e.g., intranets), local area networks (LAN), wide area networks (WAN), virtual private networks (VPN), and/or the like, though claimed subject matter is not limited to these examples. As previously mentioned, example environment 300 may be enabled using one or more special purpose computing platforms, information communication devices, information storage devices and/or databases, computer-readable codes and/or instructions, program data or information, digitized voice data or information, e-mail or text messaging data or information, signal information, specific applications and/or functions, various electrical and/or electronic circuitry or components, etc., as described herein with reference to particular example implementations.

As described below, example environment 300 may include, for example, a first wireless communication network (e.g., a cellular telephone network, the Internet, etc.) and at least one second wireless communication network (e.g., a mobile ad-hoc network, wireless sensor network, etc.). In certain implementations, a first communication network may be communicatively coupled in some manner to a second communication network, either directly and/or indirectly. As will also be seen, a first communication network may include one or more wireless devices (e.g., base stations, access points, cellular repeaters, etc.) that may communicatively support and/or extend the range of a second communication network. Such devices may also, for example, permit mobile device 100 to differentiate between wireless signals associated with a first and a second communication networks. Optionally or alternatively, a second communication network may not be coupled to a first communication network.

A first wireless communication network may be representative of one or more communication networks and/or services capable of providing wireless connectivity to at least one mobile device. As illustrated, a first wireless communication network may include, for example, at least one base transceiver station 302 communicatively coupled to at least one mobile device 100, which is represented here by a smart telephone, via one or more wireless communication channels or links 304 in accordance with one or more wireless communication protocols. A first wireless communication network may also comprise other communication devices, as indicated generally by arrow at 306, capable of providing and/or supporting wireless connectivity. By way of example but not limitation, a first wireless communication network may comprise a cellular telephone and/or like communication network. More specifically, a first wireless communication network may include, for example, a wireless wide area network (WWAN), a wireless local area network (WLAN), a wireless personal area network (WPAN), etc. Here, wireless connectivity may be accomplished via any of a wide range of wireless technologies, including future technologies. Bluetooth™, ZigBee®, Z-Wave®, Near Field Communication (NFC), and Ultra Wide Band (UWB) are just a few examples of such wireless technologies, and the scope of claimed subject matter is not limited in this respect.

Base transceiver station 302 may be representative of one or more devices capable of transmitting and/or receiving wireless signals while facilitating or supporting one or more RF-ranging assisted local sensing techniques. For example, as illustrated in FIG. 3, base transceiver station 302 may be capable of exchanging wireless signals with mobile device 100 over communication link 304 capable of providing measurements with respect to one or more characteristics of a range between base station 302 and mobile device 100. In an implementation, base transceiver station 302 may also be enabled to exchange wireless signals with one or more devices 308 of a second communication system, for example, over one or more wireless communication links 310 to facilitate or support one or more processes associated with example environment 300. It should be appreciated that in certain example implementations base transceiver station 302 may comprise an access point, such as, for example, a wireless local area network (WLAN) access point shown at 312, although the scope of claimed subject matter is not limited in this respect. It should also be noted that, for simplicity, only a few base stations, such as 302 and 312, and only certain types and/or number of mobile devices 110, 306, and 308 are depicted in FIG. 3. Of course, other examples may include additional numbers and/or types of base stations, mobile devices, etc., and the configuration of example environment 300 depicted in FIG. 3 is merely an example configuration.

In one particular implementation, a second communication network may be representative of a wireless sensor network, for example, associated with or otherwise supported by example environment 300 of FIG. 3. As previously mentioned, a second communication network may include a number of wireless devices featuring an RF ranging capability, such as, for example, mobile device 100 and one or more wireless devices serving as local reference nodes. As a way of illustration, reference nodes may be realized as a headset 314, an earphone 316, headphones 318, transceiver chips 320, access point 312, an e-book reader 322, a tablet personal computer (PC) 324, a laptop computer 326, a cellular telephone 328, just to name a few examples. As was indicated, in an implementation, mobile device 100 may utilize an RF ranging capability as a proximity detection device to help sense or detect a motion of mobile device 100 relative to a user (e.g., a local or user-centric motion). For example, RF ranging may be performed by mobile device 100 with the assistance from one or more local reference nodes based, at least in part, on one or more RF links 330 established between mobile device 100 and such one or more reference nodes.

In accordance with one particular implementation, mobile device 100 may utilize one or more short-range RF links under a line of sight (LOS) conditions between mobile device 100 and one or more reference nodes co-located with a portion of a user's body (e.g., headset 314, earphone 316, headphones 318, etc.). Based, at least in part, on such RF links, mobile device 100 may measure, for example, a range and/or changes therein between communicating devices and may use such measurements for spatial tracking of the mobile device, as previously mentioned. Here, a measured range and/or changes therein may be computed, for example, directly from a measured change in a carrier phase of a received wireless signal(s) using techniques known in the art, though claimed subject matter is not so limited. Using measurements determined from a change in carrier phase measured directly from a received wireless signal may, for example, reduce an incidence of a position drift, as was indicated. In addition, direct measurements may mitigate the effects of multipath that may occur in communications between mobile device 100 and base transceiver station 302, for example, leading to erroneous detections of transitions between mobile device 100 being in motion and being relatively still (e.g., in urban environments, etc.). It should be understood, however, that this is merely one example of how a measured range and/or changes therein may be determined, and claimed subject matter is not limited in this respect.

As previously mentioned, detectable changes in a range with respect to mobile device 100 relative to, for example, earphone 316 may be representative of a motion of mobile device 100 relative to a user (e.g., local or user-centric, etc.). Here, earphone 316 may serve as a dedicated local reference node co-located with a portion of a user's body, such as, for example, the user's head. Various other local reference nodes, such as wireless headsets, headphones, etc. may also be worn on the suitable or intended parts of the user's body (e.g., ears, neck, etc.) or, optionally or alternatively, may be co-located with the user's body by being placed in a user's pocket(s), for example. In one particular implementation, a local reference node may be realized, for example, in the form of one or more transceiver chips, such as transceiver chips 320, that may be sewn into fabric of and/or attached in some manner to the user's clothing (e.g., collar, cuffs, knee region, etc.). For purposes of explanation, chips 320 may comprise, for example, RF-based transceiver chips (e.g., ZigBee®, Bluetooth™-enabled, CMOS-based, etc.) featuring communication capability of providing time of flight information for obtaining range-related characteristics using known techniques, as will be described in greater detail below. It should be understood, however, that ZigBee®, Bluetooth™, etc. are merely examples of different types of wireless technologies that may be applied to RF ranging-assisted local motion sensing, and claimed subject matter is not limited in this respect.

In certain implementations, it may be desirable to take advantage of various RF-enabled and/or RF-compatible wireless devices that are not co-located with a portion of a user's body, but are positioned nearby or in sufficiently close proximity to mobile device 100, for example. Such wireless devices may be utilized by mobile device 100 as opportunistic local reference nodes, for example, enhancing or improving the accuracy of local motion sensing, as discussed above. In a particular implementation of FIG. 3, opportunistic local reference nodes may be represented, for example, by access point 312, e-book reader 322, tablet PC 324, laptop computer 326, cellular telephone 328, etc., although claimed subject matter is not limited in this respect. In this context, the term "proximity" may refer to a degree of nearness or closeness between a mobile device and an opportunistic reference node in that a location of the opportunistic reference node is sufficient to detecting a motion of the mobile device relative to a user. For example, an opportunistic reference node may be in sufficiently close proximity to a mobile device if the mobile device is capable of obtaining accurate measurements with respect to a range and/or changes therein from an RF link between the mobile device and the reference node communicating under clear line of sight (LOS) conditions.

As a way of illustration, mobile device 100 may be capable of concurrently receiving signals from a first RF link and a second RF link as part of concurrent communication with wireless earphone 316 co-located with the user's head and laptop computer 326 located in sufficiently close proximity to the mobile device, respectively. In this example, wireless earphone 316 may serve as a dedicated local reference node and laptop computer 326 may serve as an opportunistic local reference node, though claimed subject matter is not so limited. In operative use, an increase or decrease in amplitude of a wireless signal (e.g., from dedicated node 316, or opportunistic node 326, and/or both), the presence of a new wireless signal (e.g., from acquired opportunistic node 312, and/or 322, and/or 324, etc.), the loss of an existing wireless signal (e.g., from any node, etc.), an increase or decrease in signal propagation timing, a handover from one reference node to another reference node, etc. may be indicative of local motion of mobile device 100, thus, enhancing or improving the accuracy of local motion sensing.

It should be understood, however, that such dedicated and opportunistic references are merely examples of different types of local reference nodes that may be utilized in particular implementations, and claimed subject matter is not limited in this respect. It should also be noted, that distinction between "dedicated" and "opportunistic" local reference nodes is not absolute or static but rather fluid or dynamic meaning that wireless devices may transition among such designations based, at least in part, on particular degrees of perceived involvement in a process associated with RF ranging-assisted local motion sensing. For example, a reference node(s) may be utilized as a dedicated or opportunistic reference(s) based, at least in part, on the length of an RF link between mobile device 100 and a particular node(s), number of RF links between mobile device 100 and a particular node (s), compatibility of RF-based ranging technology, strength of a wireless signal associated with a particular node(s), and/or the like.

RF ranging-assisted local motion sensing described herein may utilize any known RF ranging and/or localization techniques and/or combinations of such techniques to accurately measure a range and/or changes therein between communicating devices and/or obtain various range-related characteristics. For example, in one particular implementation, a received signals strength (RSS)-based technique may be utilized to determine a point-to-point distance or range and/or changes therein between a wireless sender (e.g., mobile device 100, etc.) and a receiver (e.g., a local reference node, etc.) using well known techniques. In other example implementations, a processing unit associated with mobile device 100 may obtain range-related characteristics based, at least in part, on one-way or two-way (e.g., round-trip) time of flight (TOF)-based approaches using techniques known to those of ordinary skill in the art. For purposes of explanation, one-way TOF technique, also known as time of arrival (TOA), may determine a range and/or changes therein using knowledge of the propagation rate (e.g., the transit time) of a signal in a wireless RF link. In another implementation, a delay between RF signals transmitted and received in a round trip propagation (e.g., the round trip TOF) may be measured, and range-related characteristics may be obtained using knowledge of the propagation speed of RF signals. In certain implementations, one or more wireless devices may maintain a local clock synchronized to a system clock established for signaling environment 300 (e.g., via mobile device 100, master device, etc.), for example, as a common time base for accurate TOF measurements. In an implementation where mobile device 100 and one or more reference nodes are assumed to be substantially unsynchronized, accurate TOF measurements may be obtained by calculating the round trip propagation delay at mobile device 100 or at a particular reference node and dividing the result by two, as one possible example. It should be appreciated that other techniques may be used, for example, to remove at least a portion of error associated with range-related measurements arising from a bias error associated with a local clock(s) (e.g., clock drift), signal propagation, etc. Of course, these are merely examples related to ranging techniques that may be implemented in connection with RF ranging-assisted local motion sensing, and claimed subject matter is not so limited. For example, a range and/or changes therein may also be determined from a measured change in a carrier phase of a received wireless signal, as previously mentioned.

In operative use, having obtained and/or calculated one or more range-related measurements based, at least in part, on one or more established RF links, a special purpose computing platform associated with mobile device 100 may utilize such measurements to affect one or more applications hosted on the mobile device, as previously mentioned. Typically, although not necessarily, an application may refer to a computer software designed to help a user to perform a particular task or a plurality of tasks. Examples of particular applications may include word processing applications, spreadsheet applications, database applications, graphics or media applications, e-mail applications, camera stabilizing applications, desktop publishing applications, zooming and/or panning applications, and/or the like. Following the discussion above, input gestures representative of local motions of a user may be converted into specific instructions to affect such one or more applications in some manner. More specifically, upon movement of mobile device 100 relative to a local reference node, information about such movement may be generated, processed, and/or given as input in the form of computer-readable code and/or instructions to be programmatically executed through any suitable sequence of operations. According to a sequence state and/or corresponding input values, a resultant motion vector (e.g., [$\Delta x, \Delta y$], [$\Delta x, \Delta y, \Delta z$], etc.) may be computed and utilized in and/or by one or more hosted applications, for example, to derive and/or provide motion-controlled solutions for playing games, browsing maps or images, etc. on a mobile device. Techniques used in signal processing or related arts, for example, to affect an application, thus, facilitating performance of particular functions and/or operations pursuant to instructions from program software are known and need not be described here in greater detail.

In certain implementations, mobile device 100 may be realized, for example, as a smart telephone comprising a display to display visual content and a graphical user interface to manage or otherwise manipulate visual content (e.g., view Web pages, browse through maps, navigate through menus, define actions, etc.). As used herein, a "graphical user interface" (GUI) may refer to a program interface that utilizes displayed graphical information to allow a user to control and/or operate a special purpose computing platform associated with mobile device 100, for example, by a pointer and/or a pointing device. A mobile device and a display are typically specific hardware, whereas a GUI is typically an application designed to be executed by such a specific hardware. In some implementations, mobile device 100 may also comprise a network browser or a similar application that enables the mobile device to interact with display information located on a network, such as the Internet. Of course, various implementations of mobile device 100 and associated GUI are possible, and it is not intended to limit claimed subject matter to a particular implementation.

With this in mind, an example RF ranging-assisted local motion sensing technique implemented in the context of zooming and/or panning of a visual content on a user display of mobile device 100 will now be described. It should be appreciated that although such a technique may be particularly useful in the context of zooming and/or panning, claimed subject matter is not so limited. For example, such a technique may be implemented in various other contexts (e.g., gaming, social networking, web page navigation, etc.).

As used herein, "zooming" may refer to increasing (e.g., zoom in) or decreasing (e.g., zoom out) the magnification of a content within a user display area, and "panning" may refer to repositioning or re-centering a content within a user display area. Typically, although not necessarily, zooming and/or panning may be used by a user to navigate through information spaces that are too large and/or too small to be conveniently displayed and/or viewed within a user display.

In this particular example, mobile device 100 and wireless earphone 316 co-located with the user's head (e.g., dedicated local reference node) may be connected in a wireless RF link, such as, for example, link 330 of FIG. 3. A user may activate zooming and/or panning features or functionalities, for example, in connection with navigating through a digital map, web page, or other like visual content brought up on a user display (e.g., of mobile device 100) using any suitable means (e.g., via a GUI, touch screen, keypad button, etc.). Upon activation, to view a desired visual content on a user display, for example, in less detail (e.g., to zoom out), a user may operate mobile device 100 via an input gesture by moving the device further away from earphone 316 (and, thus, the eyes) in a downward motion. Wireless signals received at mobile device 100 (e.g., from RF link 330) may be processed in some manner to obtain characteristics of a range and/or changes therein representative of an input gesture(s) of a user. Depending on an implementation, such characteristics may be obtained, for example, via signal processing measuring carrier phase and/or frequency associated with wireless signals received via RF link 330 using known techniques, though claimed subject matter is not so limited. These characteristics may be subsequently converted into instructions utilizing one or more known algorithms or procedures (e.g., Hidden Markov Model-based, etc.) to affect a motion-based application hosted on mobile device 100, for example, using techniques described above. More specifically, here, a downward motion representative of an input gesture of a user may be converted into computer-readable instructions to be programmatically executed through a suitable sequence of operations by mobile device 100 to complete or otherwise perform a productive task or action for the user, such as, for example, zooming out an image on a user display. Likewise, using techniques described above, bringing mobile device 100 closer to earphone 316 (e.g., and, thus, the eyes) co-located with the user's head, for example, in an upward motion (e.g., an input gesture) may facilitate zooming in of an image on a user display. Of course, such zooming functionalities corresponding to motions of a user operating mobile device 100 may be reversed. It should be noted that zooming steps may be defined (e.g., by a user, manufacturer, service provider, etc.) so as to facilitate a sufficiently smooth zooming in and/or out (e.g., with a very little difference between zooming steps), for example, to maintain spatial awareness of a user so as to avoid or reduce disorientation.

Similarly, measurements obtained from RF link 330 associated with user inputs may be converted into instructions via a suitable algorithm to affect a hosted application to facilitating panning of visual content on a user display. Here, a user may move mobile device 100, for example, in a two-dimensional plane (e.g., left, right, up, down, etc.) relative to earphone 316 co-located with the user's head (e.g., and, thus, the eyes), and content may pan or move responsive to the direction in which the user moves the mobile device, just to illustrate one possible implementation. Of course, panning directions may be reversed, in which case panning may occur, for example, in the direction opposite to an input motion of a user. As described above with respect to zooming, likewise, here, panning steps may also be defined (e.g., by a user, manufacturer, etc.) so as to facilitate a smooth or otherwise effective panning (e.g., with sufficiently small panning steps, etc.), for example, allowing a user to pan or traverse the distance desired.

It should be appreciated that zooming and panning may be performed concurrently by a user moving mobile device 100 in a plurality of directions, for example, to navigate to a particular place(s) within an image, map, newspaper, etc. on a user display. It should also be noted that various orientation clues may be provided by a GUI in any suitable portion of a user display, for example, in the form of a navigation window, interactive compass, scale icons, etc. helping a user to maintain spatial awareness while visual content is manipulated through panning and/or zooming, as previously mentioned. To illustrate one possible implementation, a GUI associated with mobile device 100 may employ a navigation window comprising, for example, a thumbnail of the entire content space (e.g., map, image, newspaper, document, etc.) and a box to indicate the portion of the image currently displayed in a user display. It should be understood, however, that this is merely an example of how RF ranging-assisted local motion sensing may be implemented in the context of zooming and/or panning, and claimed subject matter is not limited in this respect.

In certain implementations, mobile device 100 may be capable of performing motion integration by integrating measurements, for example, from an RF ranging sensor(s) and one or more other sensors adapted to measure various states of mobile device 100 (e.g., inertial, ambient environment sensors, etc.). As a way of illustration, such one or more states may include, for example, acceleration, speed, orientation, heading, altitude, and/or the like. Motion integration may comprise, for example, integrating measurements from RF sensors, inertial sensors, ambient environment sensors, and/or other sensors associated with mobile device 100 so as to enhance or improve the accuracy of a local motion sensing, just to illustrate one possible implementation to which claimed subject matter is not limited.

Figure 4:
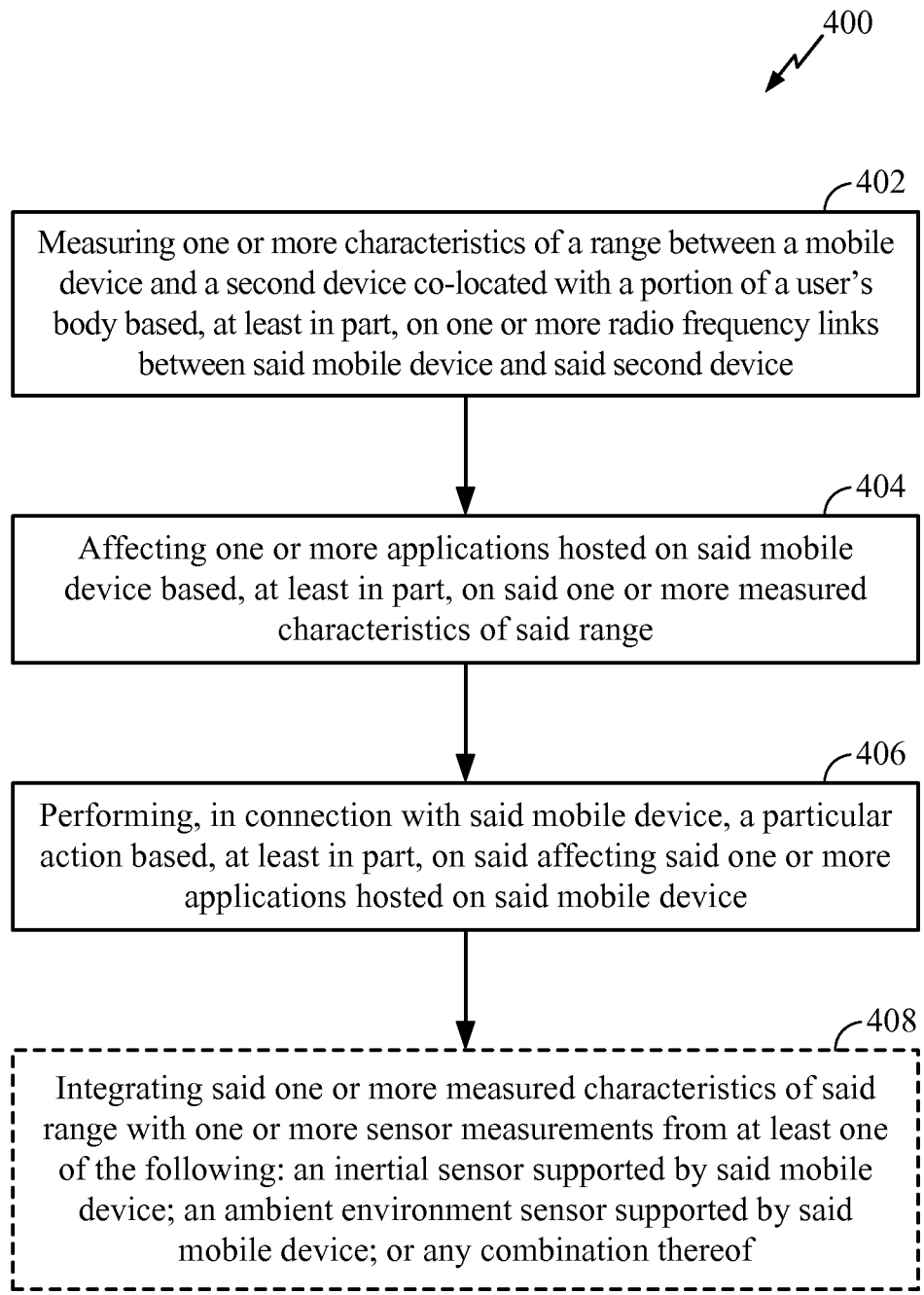
FIG. 4 is a flow diagram illustrating an implementation of an example process for performing an RF ranging-assisted local motion sensing.

FIG. 4 is a flow diagram illustrating an example process 400 for performing an RF ranging-assisted local motion sensing, according to an implementation. It should be noted that inputs and results associated with example process 400 may be represented by one or more digital signals. Example process 400 may begin at operation 402 with measuring one or more characteristics of a range between a mobile device and, for example, a second device co-located with a portion of a user's body based, at least in part, on one or more RF links established between communicating devices. By way of example but not limitation, one or more known RF ranging techniques, such as, for example, received signal strength (RSS), time of arrival (TOA), round-trip time of flight (TOF), and/or the like may be utilized to measure and/or obtain such one or more characteristics of a range. At operation 404, one or more applications, motion-based or otherwise, hosted on a mobile device may be affected based, at least in part, on such one or more measured characteristics of a range. For example, such measurements may be processed in some manner by a mobile device and given as input in the form of computer-readable code and/or instructions to be programmatically executed so as to derive and/or provide motion-controlled solutions for playing games, browsing maps or images, etc. With regard to operation 406, one or more applications hosted on a mobile device may perform a particular action, such as, for example, motion-controlled zooming and/or panning of content on a user display associated with a mobile device, though claimed subject matter is not so limited. At operation 408, a mobile device may perform motion integration, for example, to enhance or otherwise improve the accuracy of a local motion sensing. For example, one or more measurements from an RF ranging sensor(s) may be integrated with one or more measurements received from inertial sensors, ambient environment sensors, and/or other sensors supported by a mobile device and adapted to measure its various states. It should be noted that operation 408 may be optional in certain implementations.

Figure 5:
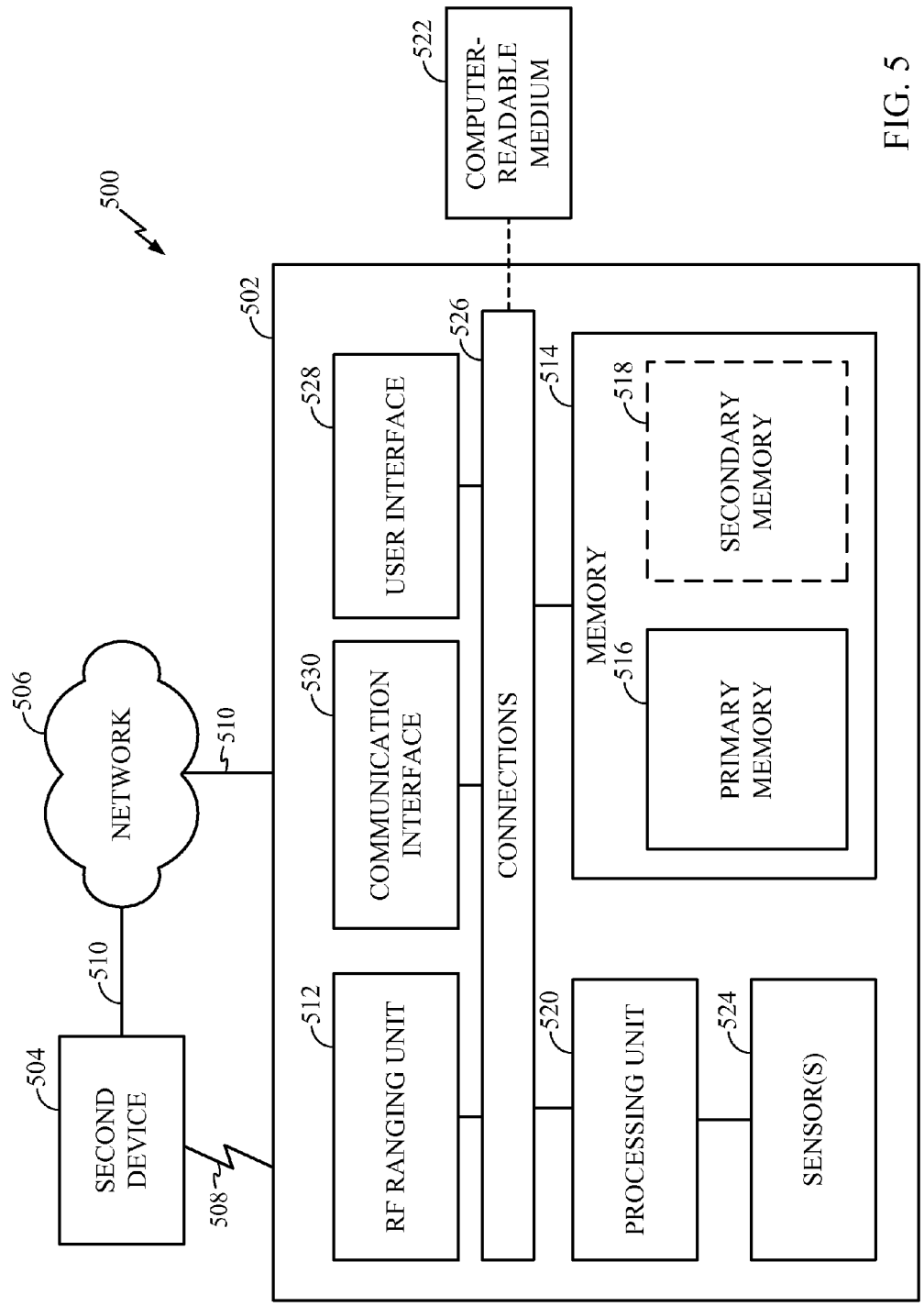
FIG. 5 is a schematic diagram illustrating an implementation of an example computing environment associated with one or more mobile communication devices supportive of the example process of FIG. 4.

FIG. 5 is a schematic diagram illustrating an example computing environment 500 that may include one or more networks and/or devices configurable to partially or substantially implement and/or support one or more processes for RF ranging-assisted local motion sensing based, at least in part, on measuring one or more characteristics of a range between communicating devices using an established RF link(s), in accordance with an example implementation. It should be appreciated that all or part of the various devices and networks shown in computing environment system 500, and the processes and methods as described herein, may be implemented using or otherwise include hardware, firmware, or any combination thereof along with software.

Computing environment system 500 may include, for example, a first device 502 and a second device 504, which may be communicatively coupled together via a first communications network 506 (e.g., a cellular telephone network, the Internet, etc.) and at least one second wireless communication network (e.g., a mobile ad-hoc network, wireless sensor network, etc.), schematically represented herein via an RF link 508, though claimed subject matter is not so limited. It should be appreciated that in certain implementations first device 502 and second device 504 may not be communicatively coupled via a first network 506. Although not shown, optionally or alternatively, there may be additional like devices communicatively coupled to network 506 and/or network 508.

In an implementation, first device 502 and second device 504 each may be representative of any electronic device, appliance, or machine that may be configurable to exchange data or information over network 506 and/or network 508. For example, first device 502 and second device 504 each may include one or more computing devices or platforms associated with, for example, a laptop computer, a desktop computer, a tablet PC, a cellular telephone, a headset, an earphone, headphones, transceiver chips, an e-book reader, a workstation, a server device, data storage units, and/or the like. In other example implementations, devices 502 and 504 may take the form of one or more integrated circuits, circuit boards, and/or the like that may be operatively enabled for use in another device. Unless stated otherwise, to simplify discussion, various functionalities, elements, components, etc. are described below with reference to first device 502, but may also be applicable to second device 504 so as to support one or more processes associated with example signal environment 300 of FIG. 3 and/or example computing environment 500.

Networks 506 and 508 may represent one or more communication links, processes, and/or resources configurable to support the exchange of data or information between first device 502 and second device 504. By way of example but not limitation, network 506 may include wireless and/or wired communication links, such as links 510, telephone or telecommunications systems, data buses or channels, optical fibers, terrestrial or satellite resources, local area networks, wide area networks, personal area networks, body area networks, intranets, the Internet, routers, switches, etc., and/or any combination thereof. Network 508 may include one or more wireless communication links facilitating or supporting wireless connectivity over one or more wireless networks, such as, for example, a mesh network, a mobile ad-hoc network, wireless sensor network, etc. Wireless connectivity may be accomplished via any of a wide range of wireless technologies, including future technologies, as previously mentioned. Bluetooth™, ZigBee®, Near Field Communication (NFC), and Ultra Wide Band (UWB) are just a few examples of such wireless technologies, and the scope of claimed subject matter is not limited in this respect. In addition, wireless connectivity may enable first device 502 to communicate with another device(s) for peer-to-peer applications, motion-controlled or otherwise, such as multi-player games, as one example among many possible.

Although not shown, in certain example implementations, first device 502 may include a location-aware and/or tracking unit associated with a Global Navigation Satellite System (GNSS) and capable of providing or supporting some form of a location/velocity/time estimation processes with regard to first device 502 based, at least in part, on one or more transmitted and received wireless signals (e.g., from space vehicles, satellites, ground-based transceivers, transmitters, etc.). A location-aware and/or tracking unit may comprise, for example, at least one receiver capable of receiving and/or processing in some manner such wireless signals via a front-end circuit, back-end processor, etc., though claimed subject matter is not so limited.

Thus, by way of example but not limitation, second device 502 may include at least one RF ranging unit 512 capable of establishing and/or supporting at least one RF link 508 between first device 502 and at least second device 504, according to an implementation. Here, RF ranging unit 512 may comprise one or more RF transceivers, various circuitry and/or logic elements (e.g., ranging sensor(s), processors, etc.) to transmit, receive, process, and/or condition transmitted and/or received wireless signals for use in obtaining one or more range-related measurements or characteristics. For example, RF ranging unit 512 may perform filtering, downconverting, signal encoding, etc., just to name a few examples. RF ranging unit 512 may also perform detection and/or tracking of range-related information or characteristics in support of one or more processes in response to specific instructions, which may be stored in memory 514, for example, along with one or more location information, measurements, threshold parameters, and/or other like information. In particular implementations, RF ranging unit 512 may also include a local clock (not shown) to support processing of wireless signals transmitted and/or received by first device 502, as discussed above.

Memory 514 may represent any information storage medium. For example, memory 514 may include a primary memory 516 and a secondary memory 518. Primary memory 516 may include, for example, a random access memory, read only memory, etc. While illustrated in this example as being separate from a processing unit 520, it should be appreciated that all or part of primary memory 514 may be provided within or otherwise co-located/coupled with processing unit 520.

Secondary memory 518 may include, for example, the same or similar type of memory as primary memory and/or one or more information storage devices or systems, such as, for example, a disk drive, an optical disc drive, a tape drive, a solid state memory drive, etc. In certain implementations, secondary memory 518 may be operatively receptive of, or otherwise enabled to be coupled to, a computer-readable medium 522. Computer-readable medium 522 may include, for example, any medium that can store and/or provide access to information, code and/or instructions (e.g., an article of manufacture, etc.) for one or more devices associated with operating environment 500.

Processing unit 520 may be implemented in hardware or a combination of hardware and software. Processing unit 520 may be representative of one or more circuits configurable to perform at least a portion of information computing technique or process. By way of example but not limitation, processing unit 520 may include one or more processors, controllers, microprocessors, microcontrollers, application specific integrated circuits, digital signal processors, programmable logic devices, field programmable gate arrays, and the like, or any combination thereof.

Computer-readable medium 522 may be accessed by processing unit 520, for example. As such, in certain example implementations, the methods and/or apparatuses may take the form, in whole or part, of a computer-readable medium that may include computer implementable instructions stored thereon, which, if executed by at least one processing unit or other like circuitry, may enable processing unit 520 and/or the other like circuitry to perform all or portions of motion sensing processes, location determination processes, sensor-based and/or sensor-supported measurements (e.g., range, changes in a range, range acceleration, range deceleration, inertial-based acceleration or deceleration, velocity, tilt, rotation, etc.) or any like processes to facilitate or otherwise support an RF ranging-assisted local motion sensing. In certain example implementations, processing unit 520 may be adapted to perform and/or support other functions, for example, associated with signaling environment 300 of FIG. 3, such as communication, navigation, etc.

First device 502 may include various components and/or circuitry, such as, for example, various sensors 524 to facilitate or otherwise support one or more processes associated with operating environment 500 (e.g., inertial sensors, ambient environment sensors, etc.), as previously described. For example, such sensors may provide analog and/or digital signals to processing unit 520. Although not shown, it should be noted that mobile device 602 may include an analog-to-digital converter (ADC) for digitizing analog signals from one or more sensors. Optionally or alternatively, such sensors may include a designated (e.g., an internal, etc.) ADC(s) to digitize respective output signals, although claimed subject matter is not so limited.

First device 502 may include one or more connections 526 (e.g., buses, lines, conductors, optic fibers, etc.) to operatively couple various circuits together, and a user interface 528 (e.g., display, touch screen, keypad, buttons, knobs, microphone, speaker, trackball, data port, etc.) to receive user input, facilitate or support sensor-related signal measurements, and/or provide information to a user. First device 502 may further include a communication interface 530 (e.g., wireless transceiver, modem, antenna, etc.) to allow for communication with one or more other devices or systems over one or more wireless communication links such as, for example, one or more communication links 508 and/or 510.

First device 502 may also include a power source (not shown) to provide power to some or all of the components and/or circuitry. A power source may be a portable power source, such as a battery, for example, or may comprise a fixed power source, such as an outlet (e.g. in a house, electric charging station, car, etc.). It should be appreciated that a power source may be integrated into (e.g., built-in, etc.) or otherwise supported by (e.g., stand-alone, etc.) first device 502.

Methodologies described herein may be implemented by various means depending upon applications according to particular features and/or examples. For example, such methodologies may be implemented in hardware, firmware, software, discrete/fixed logic circuitry, any combination thereof, and so forth. In a hardware and/or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, and/or combinations thereof, just to name a few examples.

For a firmware and/or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer and/or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

According to certain example implementations, a mobile device may, for example, be enabled for use with various wireless communication networks such as a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

Also, computer instructions/code may be transmitted via signals over physical transmission media from a transmitter to a receiver. For example, software may be transmitted from a website, server, or other remote source using a coaxial cable, fiber optic cable, twisted pair, digital subscriber line (DSL), or physical components of wireless technologies such as infrared, radio, and microwave. Combinations of the above should also be included within the scope of physical transmission media.

Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical and/or magnetic signals capable of being stored, transferred, combined, compared, or otherwise manipulated.

It has proven convenient at times, principally for reasons of common usage, to refer to such signals as bits, data, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, and/or magnetic quantities within memories, registers, or other information storage devices, transmission devices, or display devices of the special purpose computer or similar special purpose electronic computing device.

While certain example techniques have been described and shown herein using various methods and/or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method, comprising:
providing an input gesture to a mobile device by moving said mobile device;
detecting movement of said mobile device caused by said input gesture with respect to a local reference node on a user's body by measuring one or more characteristics of a range between said mobile device and a second device serving as said local reference node and co-located with a portion of said user's body based, at least in part, on one or more radio frequency (RF) links between said mobile device and said second device; and
affecting one or more applications hosted on said mobile device based, at least in part, on said movement of said mobile device caused by said input gesture and detected by said one or more measured characteristics of said range.

2. The method of claim 1, and further comprising:
performing, in connection with said mobile device, a particular action based, at least in part, on said affecting said one or more applications hosted on said mobile device.

3. The method of claim 2, wherein said particular action comprises zooming a content within a user display associated with said mobile device.

4. The method of claim 2, wherein said particular action comprises panning a content within a user display associated with said mobile device.

5. The method of claim 2, wherein said particular action is motion-controlled.

6. The method of claim 1, wherein said one or more characteristics of said range comprises at least one of the following: a measured range; a change in said range; an acceleration of said range; or a deceleration of said range.

7. The method of claim 1, wherein said measuring said one or more measured characteristics of said range is based, at least in part, on one or more time-of-flight (TOF) measurements.

8. The method of claim 1, wherein said measuring said one or more measured characteristics of said range is based, at least in part, on one or more received signal strength (RSS) measurements.

9. The method of claim 1, wherein said measuring said one or more measured characteristics of said range is based, at least in part, on measuring a change in received carrier phase.

10. The method of claim 1, wherein said mobile device comprises a wireless device having an RF-ranging capability.

11. The method of claim 1, wherein said second device comprises at least one of the following: a headset; an earphone; a pair of headphones; a transceiver chip; or a cellular telephone.

12. The method of claim 1, and further comprising:
detecting movement of said mobile device with respect to a wireless device that is not co-located with any portion of said user's body by measuring one or more characteristics of a range between said mobile device and said wireless device in proximity to said mobile device based, at least in part, on one or more radio frequency (RF) links between said mobile device and said wireless device; and affecting said one or more applications hosted on said mobile device based, at least in part, on said movement of said mobile device with respect to said wireless device detected by said one or more measured characteristics of said range between said mobile device and said wireless device.

13. The method of claim 12, wherein said wireless device comprises at least one of the following: an access point, a base transceiver station; an e-book reader, a tablet personal computer (PC), a laptop computer, or a cellular telephone.

14. The method of claim 1, and further comprising:
integrating said one or more measured characteristics of said range with one or more sensor measurements from at least one of the following: an inertial sensor supported by said mobile device; an ambient environment sensor supported by said mobile device; or any combination thereof.

15. A mobile device comprising:
a transceiver to transmit and/or receive radio frequency (RF) signals between said mobile device and a second device serving as a local reference node on a user's body and co-located with a portion of a user's body; and
one or more processors programmed with instructions to:
measure one or more characteristics of a range between said mobile device and said second device co-located with said portion of said user's body based, at least in part, on said RF signals to detect an input gesture to said mobile device provided by movement of said mobile device with respect to said local reference node on said user's body; and
affect one or more applications hosted on said mobile device based, at least in part, on said movement of said mobile device caused by said input gesture and detected by said one or more measured characteristics of said range.

16. The mobile device of claim 15, wherein said one or more processors are programmed with instructions to perform a particular action in connection with said mobile device based, at least in part, on said affecting said one or more applications hosted on said mobile device.

17. The mobile device of claim 15, wherein said one or more characteristics of said range comprises at least one of the following: a measured range; a change in said range an acceleration of said range; or a deceleration of said range.

18. The mobile device of claim 15, wherein said mobile device comprises a wireless device having an RF-ranging capability.

19. The mobile device of claim 15, wherein said one or more processors are further programmed with instructions to integrate said one or more measured characteristics of said range with one or more sensor measurements from at least one of the following: an inertial sensor supported by said mobile device; an ambient environment sensor supported by said mobile device; or any combination thereof.

20. A mobile device comprising:
means for detecting movement of a mobile device caused by an input gesture provided to said mobile device by moving said mobile device with respect to a local reference node on a user's body by measuring one or more characteristics of a range between said mobile device and a second device serving as said local reference node and co-located with a portion of a user's body based, at least in part, on one or more radio frequency (RF) links between said mobile device and said second device; and
means for affecting one or more applications hosted on said mobile device based, at least in part, on said movement of said mobile device caused by said input gesture and detected by said one or more measured characteristics of said range.

21. The mobile device of claim 20, and further comprising:
means for performing, in connection with said mobile device, a particular action based, at least in part, on said affecting said one or more applications hosted on said mobile device.

22. The mobile device of claim 20, wherein said means for measuring said one or more characteristics of said range comprises at least one of the following: means for measuring a change in said range; means for measuring an acceleration of said range; means for measuring a deceleration of said range; or means for measuring said range.

23. The mobile device of claim 20, wherein said means for measuring said one or more measured characteristics of said range comprises means for measuring one or more time-of-flight (TOF) measurements.

24. The mobile device of claim 20, wherein said means for measuring said one or more measured characteristics of said range comprises means for measuring one or more received signal strength (RSS) measurements.

25. The mobile device of claim 20, wherein said means for measuring said one or more measured characteristics of said range comprises means for measuring a change in received carrier phase.

26. The mobile device of claim 20, and further comprising:
means for integrating said one or more measured characteristics of said range with one or more sensor measurements from at least one of the following: an inertial sensor supported by said mobile device; or an ambient environment sensor supported by said mobile device.

27. An article comprising:
a storage medium having instructions stored thereon executable by a special purpose computing platform to:
measure one or more characteristics of a range between a mobile device and a second device serving as a local reference node on a user's body and co-located with a portion of said user's body based, at least in part, on one or more radio frequency (RF) links between said mobile device and said second device to detect an input gesture to said mobile device provided by movement of said mobile device with respect to said local reference node on said user's body; and
affect one or more applications hosted on said mobile device based, at least in part, on said movement of said mobile device caused by said input gesture and detected by said one or more measured characteristics of said range.

28. The article of claim 27, wherein said storage medium further includes instructions to:
perform, in connection with said mobile device, a particular action based, at least in part, on said affecting said one or more applications hosted on said mobile device.

29. The article of claim 27, wherein said instructions to measure one or more characteristics of said range comprises instructions to measure at least one of the following: a change in said range; an acceleration of said range; or a deceleration of said range; or said range.

30. The article of claim 27, wherein said storage medium further includes instructions to:
integrate said one or more measured characteristics of said range with one or more sensor measurements from at least one of the following: an inertial sensor supported by said mobile device; an ambient environment sensor supported by said mobile device; or any combination thereof.

* * * * *